May 12, 1953
T. C. GLEASON ET AL
2,638,086
AIR HEATING FURNACE
Filed June 30, 1950
3 Sheets-Sheet 1
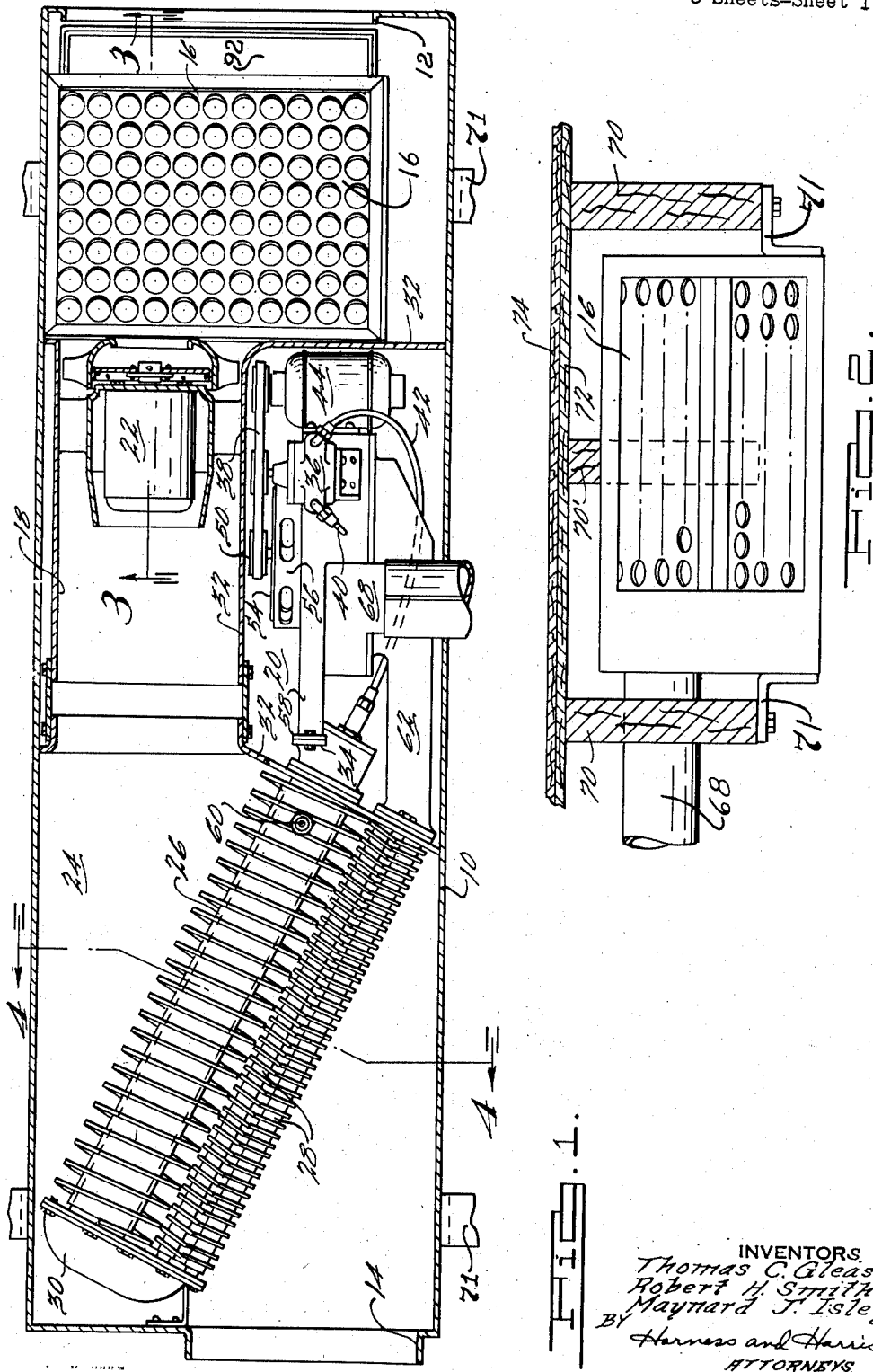
INVENTORS
Thomas C. Gleason.
Robert H. Smith.
Maynard J. Isley.
BY Harness and Harris
ATTORNEYS.

May 12, 1953     T. C. GLEASON ET AL     2,638,086
AIR HEATING FURNACE

Filed June 30, 1950     3 Sheets-Sheet 2

INVENTORS.
Thomas C. Gleason.
Robert H. Smith.
BY Maynard J. Isley.
Harness and Harris
ATTORNEYS.

May 12, 1953 T. C. GLEASON ET AL 2,638,086
AIR HEATING FURNACE
Filed June 30, 1950 3 Sheets-Sheet 3
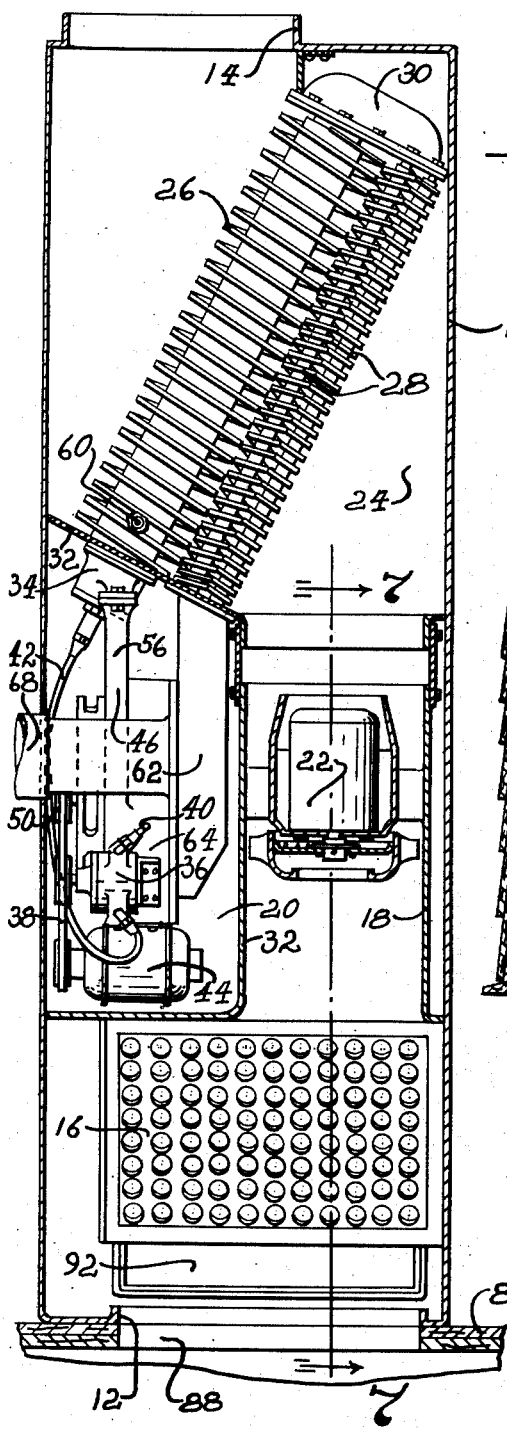
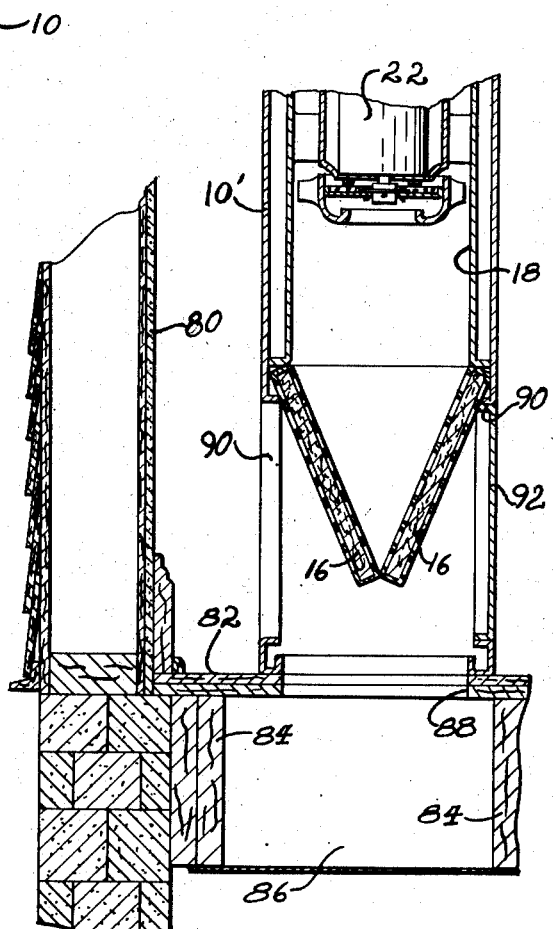
INVENTORS.
Thomas C. Gleason
Robert H. Smith
BY Maynard J. Isley
Harness and Harris
ATTORNEYS.

Patented May 12, 1953

2,638,086

UNITED STATES PATENT OFFICE 2,638,086

AIR HEATING FURNACE

Thomas C. Gleason and Robert H. Smith, Detroit, and Maynard J. Isley, Berkley, Mich., assignors to Chrysler Corporation, Highland Park, Mich., a corporation of Delaware Application June 30, 1950, Serial No. 171,452

3 Claims. (Cl. 126—110)

This invention relates to an air heating furnace structure.

It is a principal object of this invention to provide a furnace structure that is compact and elongated so that it is adapted for installation in positions which consume a minimum of usable living space in a dwelling.

The furnace is adapted to be installed between joists of a building structure by the removal of a portion of no more than one joist and its small height assures that it will not hang down below the conventional circulating ducts. The furnace may also be installed in certain buildings in the floor or may be installed so that it stands vertically in a closet.

The compact nature of the furnace which provides a high output capacity from a furnace of small volume is permitted by the novel compartmentation and arrangement of furnace components.

In the drawings:

Fig. 1 is a plan view of the furnace partly in section;

Fig. 2 is an end view of the furnace taken from the right end of Fig. 1 and showing the furnace installed between building joists;

Fig. 6 is a view similar to Fig. 1, but showing a modified form of the furnace installed in a vertical position; and Fig. 7 is a section taken on the line 7—7 of Fig. 6.

Figure 3:
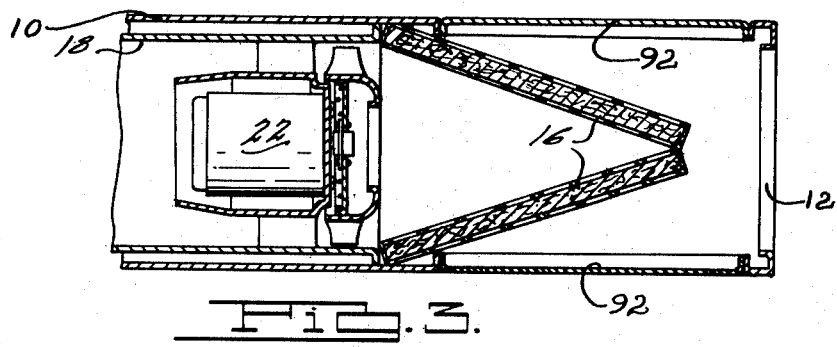
Fig. 3 is a section taken on the line 3—3 of Fig. 1.

Referring to Fig. 1 it is seen that the furnace includes an elongated casing 10 having a rectangular cross section which is provided with an inlet opening 12 in one end thereof and an outlet opening 14 in the opposite end thereof. A pair of filters 16 which are of the conventional flat type are arranged in the casing adjacent the inlet opening 12 in intersecting planes with the apex adjacent the inlet and paralleling the bottom of the housing 10. Immediately downstream of the filters an area of the housing is devoted to providing a duct 18 for air to be heated and a compartment 20 for apparatus intended to deliver a supply of a heated medium. A blower 22 which is preferably an axial flow type fan is arranged within the duct 18 to induce a flow of air through the filters 16 and the duct 18. The duct 18 and compartment 20 are generally located on opposite sides of the longitudinal centerline of the housing 10 and located in the longitudinally intermediate portion of the housing 10. The inlet opening 12 and outlet opening 14 may be connected to conventional ducting which has not been illustrated.

A compartment 24 which may be referred to as a heat exchange compartment is located downstream of the duct 18 and compartment 20. The duct 18 and the outlet 14 connect with the compartment 24 at substantially diagonally opposite portions thereof. A finned tube 26 is arranged on the other diagonal of the compartment 24 and is adapted to serve as a combustion chamber. A plurality of finned tubes 28 of smaller diameter are arranged in parallel relationship to the tube 26. A manifold 30 provides a fluid flow connection from the tube 26 to the parallel tubes 28 for the return of hot combustion gases. It will thus be seen that a U-shaped passage is provided by the interiors of the tubes for combustion gases while the fins on these tubes facilitate the transfer of heat to air flowing outside of the tubes from the duct 18 to the outlet 14. A plurality of sheet metal panels 32 are arranged to provide a physical separation of the compartment 20 from the duct 18, the filter compartment and the heat exchange compartment 24.

The compartment 20 houses a burner 34 which may burn any well known fuel but has been illustrated herein as an oil burner. A fuel pump is illustrated at 36 as driven by a belt 38 and provided with a tube 40 connected to a source of supply of fuel and a tube 42 which connects the tube 36 with the burner 34. The belt 38 is driven by an electric motor 44.

Figure 5:
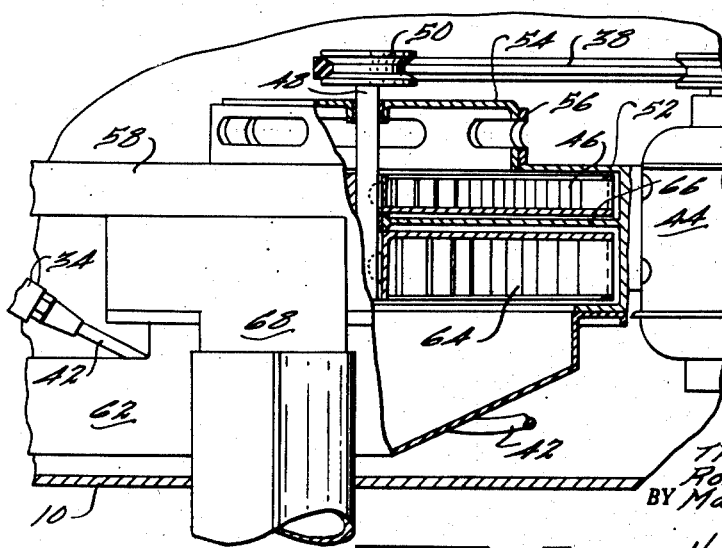
Fig. 5 is a plan view, partly in section, of a portion of Fig. 1.

The compartment 20 also houses means for inducing an air flow through the tubes 26 and 28. A blower 46 which is illustrated in Fig. 5 is keyed to a rotatable shaft 48 having a pulley 50 adapted to be driven by the belt 38. The blower 46 is housed within a scroll 52 with an axial air inlet and a supplemental housing 54 having an adjusting ring 56 both of which are provided with openings for relative rotation to control the amount of air which may be drawn in by the blower 46. The blower 46 which operates in the scroll 52 has a manifold or ducting 58 associated with the scroll so that air discharged thereby is discharged into the tube 26 in close proximity to the burner 34. A conventional spark plug 60 connected to a source of electric current (not shown) is provided in the tube 26 to control the ignition of the fuel and air mixture. The tubes 28 terminate in a manifold 62 which connects with a second blower designated by the numeral 64 which is also carried by shaft 48 and positioned within scroll 52 but separated from blower 46 by a partition 66. The scroll 52 in the region of the blower 64 terminates in exhaust duct 68 which extends through the housing 10 for the discharge of hot combustion gases. The blower 64 serves as a suction blower to facilitate the passage of the fuel and air mixture through the tubes 26 and 28.

Figure 4:
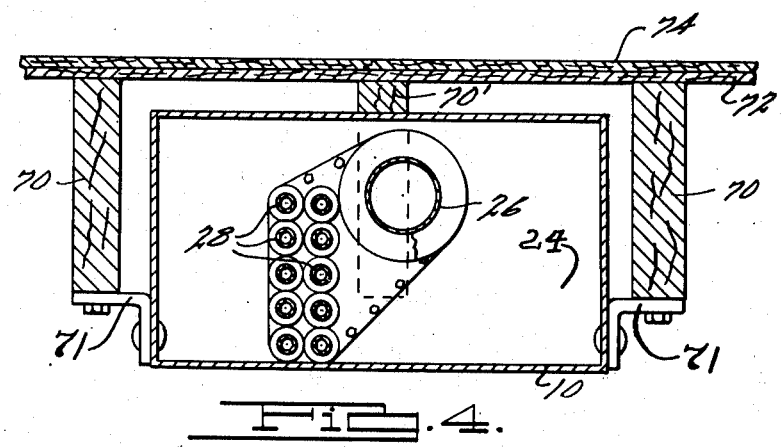
Fig. 4 is a section taken on the line 4—4 of Fig. 1.

The above described arrangement of components is particularly adapted to crowd a maximum of heat exchange surface into a minimum of space. The compact nature of the furnace permits it to be installed in a building at locations which are desirable and offer a minimum obstruction to normal living in the building. Referring to Fig. 4 it will be noted that a conventional building construction is illustrated in which parallel horizontal joists 70 are used to support subflooring 72 and finish flooring 74. In conventional home construction these joists are usually spaced approximately 16 inches apart and with my novel furnace construction it has been found possible to construct a furnace of approximately one hundred thousand B. t. u. per hour capacity that is sufficiently narrow that it may be installed between joists as illustrated in Fig. 4 with a portion only of a joist 70' removed. The furnace has also been found to have a height sufficiently small so that it does not protrude much below a conventional 10 inch joists 70 when mounted as illustrated. Since this is the normal location for heating ducts it follows that practically no additional space is utilized by the furnace and that it becomes a portion of the ducting. Brackets 71 support the furnace from joists 70.

An alternative installation of the furnace is illustrated in Figs. 6 and 7 in which the furnace stands vertically in an unobtrusive location such as a closet. Referring to Fig. 7 a conventional building wall 80, floor 82 and joists 84 are illustrated. A cold air return duct 86 is provided between joists 86 in the usual manner. The furnace stands vertically on floor 82 with the air inlet 12 aligned with an opening 88 in floor 82 so that air to be heated may be drawn upwardly through filters 16 from duct 86. The casing 10' is preferably provided with an additional opening 90 in a side wall adjacent filters 16 for the admission of air directly from the room to be heated. The casing 10' is preferably provided with two diametrically opposed openings 90 and removable panels 92 which may be selectively positioned in the openings 90. There are thus illustrated in Figs. 3 and 7 three alternative air inlet openings and any one or more thereof may be chosen as most suitable for an individual installation. The outlet 14 for heated air may be connected to ducting (not shown) as was previously mentioned with respect to the Fig. 1 form of the invention.

In Figs. 6 and 7 the furnace illustrated has been modified slightly from the Figs. 1 through 5 form in that the relationship of the large tube 26 to the small tubes 28 has been reversed with the air to be heated first contacting the small tubes 28. The reversal of tubes 26 and 28, of course, requires a corresponding repositioning of the components in compartment 20 although their functions are not altered. The repositioned components are illustrated in Fig. 6 and have been given the same numbers as those used in Fig. 1. Further comment on the positions of the individual components is not believed to be necessary. The fan 22 has also been illustrated as located at a slightly different position in the duct 18.

We claim:

1. A furnace comprising an elongated straight duct-like casing of substantially uniform cross sectional area throughout its length, said casing having a width dimension in excess of its heighth and a length substantially in excess of its width and including side, bottom, top and end walls defining said casing, said casing having an air inlet and an air outlet in the respective opposite end portions thereof, means defining an air passage extending longitudinally of said casing and the major portion of which is disposed on one side of the longitudinal center line of the casing and connected at one end thereof with said inlet, an axial flow type fan located in said passage and operable to draw air from said inlet and impel such air longitudinally through said passage, a fuel burner and combustion air blowers disposed on the other side of the longitudinal center line of the casing, transversely extending partition means cooperating with a portion of said walls to define a heat exchange compartment within said casing between said passage and the end portion containing said air outlet, said passage being connected with said compartment substantially diagonally opposed to said air outlet, an elongated heat exchanger mounted in said compartment in substantial alignment with the other diagonal of said heat exchange compartment, said heat exchanger comprising a finned combustion tube having one end thereof terminating adjacent said partition means, a plurality of relatively small finned tubes extending in close proximity to and parallel to said combustion tube and terminating adjacent said partition means, a manifold operatively connecting the ends of said tubes remote from said partition means, said fuel burner communicating with said combustion tube, one of said combustion air blowers being operatively connected to said combustion tube and the other of said combustion air blowers being operatively connected to said small tubes for the withdrawal of the products of combustion therefrom, said axial flow type fan being operable to impel air from said inlet, through said passage and heat exchange compartment and discharge such air from said outlet.

2. A furnace comprising an elongated straight duct-like casing of substantially uniform cross sectional area throughout its length, said casing having a width dimension in excess of its heighth and a length substantially in excess of its width and including side, bottom, top and end walls defining said casing, longitudinally extending partition means dividing a portion of said casing into a longitudinally extending air passage and an apparatus compartment aligned with said passage, transversely extending partition means connecting each end of said longitudinally extending partition means and one of said side walls to cooperate with said one side wall and said longitudinally extending partition to enclose said apparatus compartment, the transversely extending partition means at one end of said longitudinally extending partition means being spaced from one of said casing end walls and cooperating therewith and with the side, top and bottom walls of said casing to define a heat exchange compartment in fluid flow communication with said air passage adjacent one corner of said heat exchange compartment, an elongated heat exchanger extending from said last mentioned transversely extending partition means to a corner of said heat exchange compartment aligned with said air passage and extending diagonally of said heat exchange compartment, said heat exchanger comprising a finned combustion tube, a plurality of relatively small finned tubes extending in close proximity to and parallel to said combustion tube and a manifold operatively connecting the ends of said tubes remote from said partition means, said casing having an air inlet in one end wall thereof and an air outlet in the other end wall thereof to furnish a discharge for heated air from said heat exchange compartment, said air outlet being longitudinally aligned with said apparatus compartment, an axial flow type fan located in said air passage and operable to draw air from said inlet and impel such air longitudinally through said passage and into said heat exchange compartment in which it travels diagonally thereacross to said outlet, a fuel burner having the major portion thereof located in said apparatus compartment, said fuel burner communicating with said combustion tube, and combustion air blowers located in said apparatus compartment and operable to furnish combustion air to support combustion of fuel in said combustion tube and exhaust the products of combustion from said relatively small finned tubes and a flue extending from said apparatus compartment for the discharge of the products of combustion.

3. A self contained heater unit including an elongated casing having an air inlet and an air outlet in the respective opposite end portions thereof, a longitudinally extending housing the major portion of which is disposed on one side of the longitudinal center line of the casing, said housing connecting at one end thereof with said inlet and having a discharge end within the casing, an axial flow type fan in the housing operable to draw air therein from said inlet and to impel such air from said housing in a path toward said outlet, a burner and combustion air blower in said casing transversely opposite to said fan housing and disposed on the other side of the longitudinal center line of the casing, a heat exchange unit in the casing extending generally diagonally of the center line of the casing between the discharge end of said housing and the outlet of said casing and across the path of air impelled by said fan, said heat exchange device comprising a finned combustion tube having one end operatively associated with said burner, a plurality of tubes of relatively small diameter extending in close proximity to and parallel to said combustion tube and a manifold operatively connecting the ends of said combustion tube with the ends of said smaller tubes remote from said burner, said tubes having outlet ends thereof adjacent said burner to discharge the products of combustion from said heat exchanger.

THOMAS C. GLEASON.
ROBERT H. SMITH.
MAYNARD J. ISLEY.

References Cited in the file of this patent

UNITED STATES PATENTS

| Number | Name | Date |
|---|---|---|
| 2,194,733 | Andersen et al. | Mar. 26, 1940 |
| 2,263,098 | Mueller | Nov. 18, 1941 |
| 2,302,859 | Hare | Nov. 24, 1942 |
| 2,308,888 | McCollum | Jan. 19, 1943 |
| 2,324,010 | Myerhoefer et al. | July 13, 1943 |
| 2,362,271 | Heymann | Nov. 7, 1944 |
| 2,388,364 | Page et al. | Nov. 6, 1945 |
| 2,447,373 | Smoot | Aug. 17, 1948 |
| 2,487,269 | Ott | Nov. 8, 1949 |
| 2,492,654 | Richards | Dec. 27, 1949 |
| 2,581,942 | Collins et al. | Jan. 8, 1952 |